Nov. 30, 1948.   F. B. LOMAX   2,455,130
METHOD OF AND APPARATUS FOR FILTERING
Filed Nov. 8, 1945
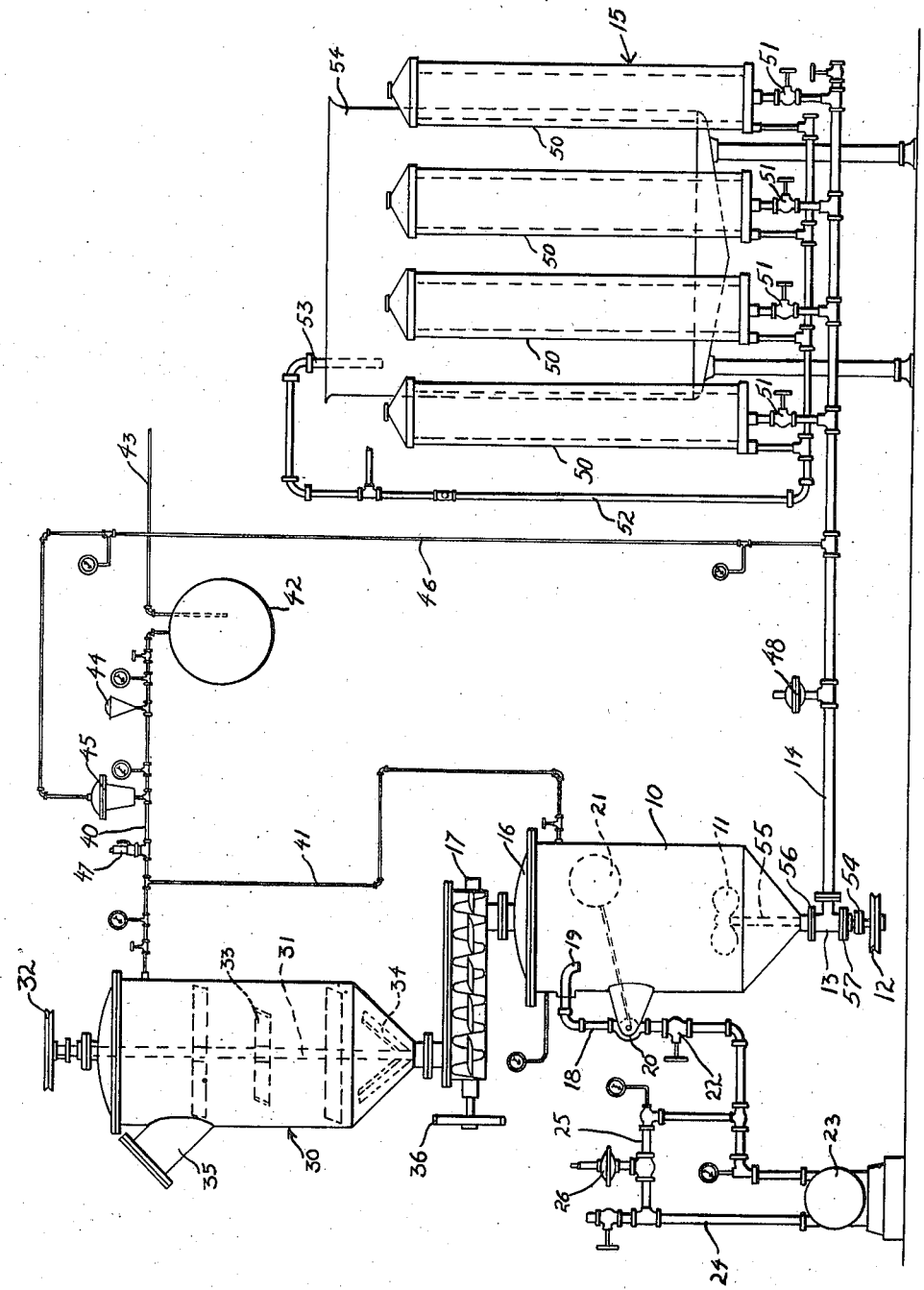
Inventor
Frank B. Lomax Patented Nov. 30, 1948

2,455,130

UNITED STATES PATENT OFFICE 2,455,130

METHOD OF AND APPARATUS FOR FILTERING

Frank B. Lomax, Chicago, Ill.; Mary P. Lomax, executrix of said Frank B. Lomax, deceased, assignor to Mary P. Lomax, Chicago, Ill.

Application November 8, 1945, Serial No. 627,352

2 Claims. (Cl. 210—177)

This invention relates to a method of and apparatus for filtering liquids and particularly liquids such as whiskey, wine, syrup, water, etc.

In the past, it has been the practice in the filtering of such liquids to add to them filteraid, such as diatomaceous earth, kieselguhr, neutral earth, etc. These filteraids, as is well known, were added for the purpose of coating the filtering element or plate through which the liquid is to be passed. The addition of such filteraids to the liquid has been found to be very detrimental to the pumps employed in the pumping of the liquid through the filter system. This is due to the fact that such filteraids have a serious abrasive action on the parts of the pump or the bearings which materially increases the wear and tear on these parts.

An object of this invention is to obviate the foregoing unsatisfactory condition in existing filtering systems.

Another object of this invention is to provide an improved method of and apparatus for filtering wherein the liquid to be filtered and the filteraid may be separately impelled into a common area without the filteraid having to pass through the impelling means for the liquid.

Another object of this invention is to provide, in a filtering system of the foregoing type, controlled fluid pressure equalizing connections for the separated filteraid and liquid containing chambers or tanks.

In accordance with the general features of this invention there is provided in a method of filtering the steps of feeding liquid to be filtered into a confined area, separately discharging into the area a filteraid and flowing from said area, independent of the feeding step, the liquid and filteraid into a filtering zone.

Another feature of the invention relates to the provision of steps for equalizing the fluid pressure above and below the mass of filteraid being discharged into the liquid containing chamber or tank.

In accordance with other features of this invention there is provided in the filtering system a confined chamber, means for impelling the fluid under pressure to be filtered into this chamber, an adjoining tank containing a supply of filteraid, an automatic feeding device between the tank and chamber for discharging predetermined quantities of filteraid in the chamber, fluid pressure connections between the tank and chamber and a source of fluid under pressure for equalizing the fluid pressure in the tank and chamber above and below the mass of filteraid being fed in the chamber, a filtering device and a connection between a discharge end of the chamber and the filtering device for delivering a stream of liquid and filteraid to the filtering device independently of the pressure of the liquid being impelled into the chamber.

Other objects and features of this invention will more fully appear from the following detail description taken in connection with the accompanying drawings which illustrate a single embodiment thereof and in which the single figure is a more or less diagrammatic view of a filtering system embracing the features of this invention.

As shown on the drawing:

It is believed that my novel method and apparatus will be fully understood from a description of the diagrammatically illustrated system in the accompanying drawing.

The reference character 10 designates generally a closed tank or chamber having rotatably disposed in its lower portion an agitating blade or propeller 11 suitably driven by a pulley drive 12 on the exterior of the chamber. The lower end of the chamber is connected by the means of a suitable T 13, through which the drive for the agitator extends, to a discharge pipe line 14 leading to a filtering zone or area designated generally by the reference character 15.

The upper end of the tank 10 has a removable lid or cover 16 through which a filteraid is adapted to be discharged by an automatic screw feed device designated generally by the reference character 17. The filteraid may be of any conventional type, such, for example, as diatomaceous earth, neutral earth or kieselguhr.

The tank 10 is adapted to have discharged into it, through a pipe line 18, a liquid to be filtered, such, for example, as whiskey, wine, syrup, water, etc. The pipe line 18 has a bent discharge end 19 positioned within the upper part of the tank 10. The pipe line 18 has a conventional flow control valve 20 adapted to be operated in the usual way by a ball type of float 21 disposed inside of the tank and responsive to the level of the liquid therein.

The pipe line 18 also has connected in it a conventional shut-off valve 22. This pipe line leads to the discharge end of a conventional centriufgal or rotary wine or beer pump 23. The inlet side of the pump 23 has connected to it a supply pipe line 24. There is also disclosed between the outlet and inlet pipe lines 18 and 24 a pipe connection 25 including a pressure release valve 26 which may be given any predetermined setting.

Associated with the syrup tank or chamber 10 is an adjoining closed tank or chamber 30 provided on the interior thereof with a rotary shaft 31 adapted to be driven by any suitable external means, such, for example, as a power driven pulley 32. The shaft has secured to it a stirrer 33 and an agitator 34.

The upper end of the tank 30 is provided with a charging opening 35 through which a supply or batch of filteraid of the character previously mentioned may be delivered into the tank 30.

The lower or discharge end of the tank 30 is connected to the upper end of the tank 10 by means of the spiral screw feed device 17 previously mentioned. This screw device may be of any suitable conventional construction and is adapted to be driven by a pulley 36 connected to any suitable prime mover or driving device.

A fluid pressure line 40 is connected to the upper end of the tank 30. This fluid pressure line 40 also has a pipe line connection 41 with the upper end of the tank 10. The arrangement is such that the same amount of fluid pressure may be applied to the contents of both tanks. Thus, both the upper and bottom sides of the mass of filteraid located between the tanks in the screw feed 17 are subjected to an equalizing pressure. This enables the material to be fed into the tank 10 by the screw action of the feed device 17 rather than by any difference in fluid pressure acting upon the mass of filteraid being discharged from the upper tank 30 to the lower tank 10.

The fluid pressure pipe line 40 is connected to a supply tank of air or carbon dioxide 42. This tank may be supplied with fluid pressure by means of a pipe line 43. I propose that the tank have a gas pressure of from 100 to 125 pounds. Not all of this pressure, however, is utilized in the pipe line 40 since the pressure regulator 44 is so set as to cut down the amount of pressure in the line to about 50 pounds. In addition, the pipe line 40 is provided with a pressure regulator 45 connected by means of a fluid pipe line 46 to the discharge pipe line 14 leading away from the tank 10. This gas pressure regulator 45 is of a conventional diaphragm type and is set to enable the pressure of the fluid or gas delivered in the tanks 30 and 10 to be about one pound in excess of the existing varying instantaneous liquid pressure in the pipe line 14.

It should be noted that the pipe line 40 has a pop valve 47 and that the pipe line 14 has a pressure release valve 48. As illustrated, pressure gauges may be disposed wherever desired in the pipe lines, and inasmuch as that is more or less conventional practice in any fluid pressure line, no reference numerals are being applied to the gauges. Shut-off valves may also be used wherever desired.

The discharge pipe line 14 is connected to a series of filters 50 disposed at the filtering zone 15. Each of these filters may be of any suitable conventional construction and may be of either the plate or tube type such as are fully known in the trade.

Also, these filters 50 are so arranged relative to the pipe line 14 that they may be all connected to the pipe line at the same time for receiving liquid therefrom, or they may be separately opened to the pipe line as desired by a valve 51 associated with each of the filters.

The discharge end of each of the filters 50 is connected to a common pipe line 52 which discharges at its upper end 53 into a suitable tank or receptacle 54 for receiving the filtrate.

The T 13 has a suitable packing 54 for sealing the T through which a shaft 55 rotatably depends for driving the agitating propeller 11. Shaft 55 is journaled in a suitable web bearing 56 and a bearing 57 so that the fluid may be discharged from the tank 10 through the T and along the pipe line 14. The upper web bearing 56 is of a spoked type with a central hub in which the shaft 55 is journaled; fluid being free to flow through the web between the spokes.

In the operation of my system, it is clear that the liquid to be filtered is delivered or pumped under pressure into the tank 10 entirely independently of the delivery of filteraid to the tank 10. That is to say, the supply of filteraid in the upper tank 30 is forced by the screw or worm 17 into the tank 10 entirely independently of the pressure of the pump 23. Thus there is no likelihood of the filteraid getting into the parts or bearings of the pump 23 and wearing the same out.

The level of the liquid to be filtered and delivered into the tank 10 may be controlled by the conventional flow control valve 20. The amount of filteraid to be charged into the tank 10 is, of course, regulated by the lead of the screw 17. In other words, the screw may be so adjusted and timed as to deliver filteraid at a predetermined rate to the liquid in the tank 10.

The stirrer or propeller 11 in the tank 10 serves to thoroughly mix the filteraid with the liquid so that a substantially homogeneous liquid is delivered into the pipe line 14 leading to the filter area or zone 15.

It should also be noted that the gas pressure line previously discussed and including the lines 40 and 41 serve to equalize the pressure on opposite sides of the mass of filteraid in the tank 30 and in the feed device 17 whereby the filteraid is propelled into the tank 10 solely by the forward speed of the screw or worm 17.

The arrangement of the tank hopper 30 containing the filteraid is such as to insure a proper and adequate amount of filteraid being delivered to the liquid to be filtered. The amount of filteraid, of course, depends upon the character and size of the filter, and of course, should be sufficient to adequately coat the filtering surface of the filter. It is usually customary to use a filter paper and the filteraid should be of such type of character so as to properly pre-coat the filter paper. Moreover, during the continuous filtering of the liquid being forced from the tank or chamber 10 the coat of filteraid on the filter surface is continually being increased.

In conclusion, it should be noted that the pressure of the gas delivered to the chamber 10 acts upon the fluid in the lower part of the tank or chamber so that the same is subjected to a pressure tending to force it out of the tank to the pipe line 14 leading to the filtering zone 15. However, as noted before, at no time is there any opportunity afforded for the filteraid or earth to get into the pump 23 or in the line 18 leading to the same.

I claim as my invention:

1. In a method of filtering, the steps of forcing under pressure liquid to be filtered into a given confined area, separately discharging into said area a filteraid from a supply of said filteraid in a separate adjoining chamber, subjecting said area and chamber to fluid pressure so that the pressure of the fluid on both sides of said supply of filteraid is substantially equalized, flowing from said area, independently of said forcing step, said liquid and filteraid into a filtering zone and controlling the pressure of said fluid by the pressure of the stream of liquid and filteraid discharged from said area and in advance of the filtering zone.

2. In a filtering system, a confined chamber, means for impelling under pressure liquid to be filtered in said chamber, an adjoining tank containing a supply of filteraid, a feeding device between said tank and chamber for discharging predetermined quantities of filteraid into said chamber, fluid pressure connections between said tank, said chamber and a source of fluid under pressure for equalizing the fluid pressure in said tank and chamber above and below respectively the mass of filteraid being fed into said chamber, a filtering device, a connection between a discharge end of said chamber and said filtering device for delivering a stream of liquid and filteraid to the filtering device independently of the pressure of the liquid being impelled in said chamber and a fluid connection between the discharged stream and the equalizing pressure connections for controlling said equalizing pressure.

FRANK B. LOMAX.

REFERENCES CITED

The following references are of record in the file of this patent:

UNITED STATES PATENTS

| Number | Name | Date |
| --- | --- | --- |
| 1,040,090 | Zahm | Oct. 1, 1912 |
| 1,604,649 | Manning | Oct. 26, 1926 |
| 1,853,263 | Dudley | Apr. 12, 1932 |
| 2,214,671 | Hagan | Sept. 10, 1940 |
| 2,294,697 | Seip | Sept. 1, 1942 |